United States Patent
Bauer

(10) Patent No.: US 9,288,999 B2
(45) Date of Patent: Mar. 22, 2016

(54) ENCLOSED VACUUM TUMBLING DEVICE

(71) Applicant: HOLLYMATIC CORPORATION, Countryside, IL (US)

(72) Inventor: Erik Bauer, Alto, MI (US)

(73) Assignee: HOLLYMATIC CORPORATION, Countryside, IL (US)

( * ) Notice: Subject to any disclaimer, the term of this patent is extended or adjusted under 35 U.S.C. 154(b) by 146 days.

(21) Appl. No.: 13/936,577

(22) Filed: Jul. 8, 2013

(65) Prior Publication Data

US 2014/0010929 A1 Jan. 9, 2014

Related U.S. Application Data

(60) Provisional application No. 61/669,355, filed on Jul. 9, 2012.

(51) Int. Cl.
*A23B 4/00* (2006.01)
*A22C 9/00* (2006.01)

(52) U.S. Cl.
CPC ..................... *A22C 9/005* (2013.01)

(58) Field of Classification Search
CPC .......... A22C 9/005; A23B 4/021; A23G 3/26; A23L 1/31; A23L 1/318; A23L 1/3187; A23L 3/015; A23L 3/0155; A23P 1/082; A23P 1/083; B05C 3/05; B05C 3/08; B65D 81/2007; B65D 81/2038
See application file for complete search history.

(56) References Cited

U.S. PATENT DOCUMENTS

| | | | |
|---|---|---|---|
| 4,421,020 A | 12/1983 | Gross | |
| 4,522,118 A * | 6/1985 | Simonsen et al. | 99/472 |
| 4,818,550 A | 4/1989 | Davidson | |
| 4,994,294 A * | 2/1991 | Gould | 426/519 |
| 6,015,580 A * | 1/2000 | Mays | 426/281 |
| 6,019,034 A | 2/2000 | Ford, Sr. | |
| 6,040,013 A * | 3/2000 | Karales | 427/281 |
| 6,242,025 B1 | 6/2001 | Lesky et al. | |
| 7,229,656 B2 | 6/2007 | Paumen et al. | |
| 7,670,042 B2 | 3/2010 | Cheung | |
| 2010/0084307 A1 | 4/2010 | Yeghiayan et al. | |

OTHER PUBLICATIONS

International Search Report issued on Dec. 16, 2013 for corresponding PCT Application PCT/US2013/049534.
Written Opinion of the International Search Authority dated Dec. 16, 2013 for corresponding PCT Application PCT/US2013/049534.

* cited by examiner

*Primary Examiner* — Dana Ross
*Assistant Examiner* — Brandon Harvey
(74) *Attorney, Agent, or Firm* — Sughrue Mion, PLLC

(57) ABSTRACT

A vacuum tumbling system for marinating meat including a vacuum sensor; an airtight driver; an outer vacuum chamber configured to monitor and pull a vacuum; and an inner vacuum tumbling chamber configured to enclose a marinade mixture, liquid, and the meat, configured to be disposed inside the outer vacuum chamber, and configured to pull the vacuum from the outer vacuum chamber through a small hole which is recessed on a bottom surface of the inner vacuum tumbling chamber. The outer vacuum chamber monitors the vacuum through the vacuum sensor, pulls the vacuum through the airtight driver, and tumbles the inner vacuum tumbling chamber in response to the airtight driver being driven.

13 Claims, 4 Drawing Sheets

ENCLOSED VACUUM TUMBLING DEVICE

CROSS-REFERENCE TO RELATED APPLICATION

This application claims priority under 35 USC §119 to U.S. Provisional Application No. 61/669,355, filed on Jul. 9, 2012, the contents of which are herein incorporated by reference in its entirety.

BACKGROUND

1. Technical Field

Exemplary embodiments relate to a vacuum tumbling device. In particular, exemplary embodiments relate to an enclosed vacuum tumbling device for marinating meat.

2. Description of the Related Art

Vacuum tumblers in the related art use a container filled with contents to be marinated, marinade, and liquid. In the related art, the vacuum is drawn directly into the container. The container is then tumbled (i.e., rotated), allowing the marinade and liquid to enter the meat. During tumbling, the rotating container is fully exposed, as is discussed below.

In the related art, a vacuum hose is attached to the container until a time when a desired vacuum is reached. When the desired vacuum is reached, a valve in the container is closed, and the vacuum hose is removed. The desired vacuum removes the air from the container and removes fluid from the meat so that the meat can accept the marinade and mix. Then, a tumbling action rotates the container. The container may have fins that help move the meat to the top of the container and then allow the meat to drop into the liquid and marinade mix. Therefore, in the related art, the liquid and marinade mix enters and marinates the meat. Typical related art devices may use a vacuum gauge and a time for timing the tumbling.

However, the related art vacuum tumblers can lose vacuum after the vacuum hose is removed. Therefore, the related art vacuum tumblers can lose efficiency when vacuum is reduced or lost. Further, the outside of the related art vacuum tumbler container is exposed. The exposed rotating container is disadvantageous because the liquid, marinade mix, and contents (e.g., meat) can easily spill from the container, creating an unattractive mess. Further, the exposed rotating container could cause human injury at pinch points.

SUMMARY

Exemplary embodiments may provide a system that is simple to use, holds a constant vacuum, and protects a consumer from the rotating container.

Exemplary embodiments may provide a system that allows production of thoroughly marinated mixture in several minutes.

Exemplary embodiments may provide a system that provides a consistent vacuum, makes clean up easier, and encloses the rotating container (i.e., container is not exposed). Further, exemplary embodiments disclose that the enclosed rotating container improves safety and prevents human injury. The system of the exemplary embodiments can be used in either a consumer environment or a production environment.

According to an aspect of an exemplary embodiment, a vacuum tumbling system is provided for marinating meat, the system includes a vacuum sensor, an airtight driver, an outer vacuum chamber configured to monitor and pull a vacuum, and an inner vacuum tumbling chamber configured to enclose a marinade mixture, liquid, and the meat, configured to be disposed inside the outer vacuum chamber, and configured to pull the vacuum from the outer vacuum chamber through a small hole which is recessed in a bottom surface of the inner vacuum tumbling chamber. The outer vacuum chamber monitors the vacuum through the vacuum sensor, pulls the vacuum through the airtight driver, and tumbles the inner vacuum tumbling chamber in response to the airtight driver being driven.

The airtight driver includes a vacuum pump configured to be powered on or off based on the monitored vacuum, a vacuum motor configured to drive the vacuum pump for pulling the vacuum, a tumble motor configured to tumble the inner vacuum tumbling chamber, and a circuit board configured to be connected to at least one of the vacuum pump, the vacuum motor, and the tumble motor.

The airtight driver is configured to be disposed inside the outer vacuum chamber.

The airtight driver is configured to be disposed external to the outer vacuum chamber.

The airtight driver is configured to be driven by an external electrical outlet.

The airtight driver is configured to be driven by a battery which is enclosed by the outer vacuum chamber.

The vacuum pump is configured to be powered on in response to the monitored vacuum being below a predetermined level.

The vacuum pump is configured to be powered off in response to the monitored vacuum being equal to or greater than a predetermined level.

The inner vacuum tumbling chamber is tilted approximately 15 degrees with respect to a horizontal plane when the inner vacuum is disposed inside the outer vacuum chamber.

The inner vacuum tumbling chamber includes at least one fin in an inner wall of the inner vacuum tumbling chamber to move the meat to a top of the inner vacuum tumbling chamber.

The outer vacuum chamber may have a mating adapter which mates with an attachment of the inner tumbling vacuum chamber.

According to an aspect of an exemplary embodiment, a method of marinating meat in a vacuum tumbling system, the method includes monitoring a vacuum in an outer vacuum chamber, tumbling an inner vacuum chamber, which is configured to enclose a marinade mixture, liquid, and the meat and configured to be disposed inside the outer vacuum chamber, and maintaining a predetermined vacuum level of the outer vacuum chamber based on a value of the monitored vacuum. The inner vacuum chamber is further configured to pull the vacuum from the outer vacuum chamber through a small hole which is recessed on a bottom surface of the inner vacuum tumbling chamber.

The inner vacuum tumbling chamber is tumbled by an airtight driver.

The airtight driver includes a vacuum pump configured to be powered on or off based on the monitored vacuum, a vacuum motor configured to drive the vacuum pump for pulling the vacuum, a tumble motor configured to tumble the inner vacuum tumbling chamber, and a circuit board configured to be connected to at least one of the vacuum pump, the vacuum motor, and the tumble motor.

The airtight driver is configured to be disposed inside the outer vacuum chamber.

The airtight driver is configured to be disposed external to the outer vacuum chamber.

The airtight driver is configured to be driven by an external electrical outlet.

The airtight driver is configured to be driven by a battery which is enclosed by the outer vacuum chamber.

The vacuum pump is configured to be powered on in response to the monitored vacuum being below a predetermined level.

The vacuum pump is configured to be powered off in response to the monitored vacuum being equal to or greater than a predetermined level.

According to an aspect of an exemplary embodiment, a vacuum tumbling system is provided for marinating a material, the system includes a vacuum sensor, an airtight driver, an outer vacuum chamber configured to monitor and pull a vacuum, an inner vacuum tumbling chamber configured to enclose a marinade mixture, liquid, and the material, configured to be disposed inside the outer vacuum chamber, and configured to pull the vacuum from the outer vacuum chamber. The outer vacuum chamber monitors the vacuum through the vacuum sensor, pulls the vacuum through the airtight driver, and tumbles the inner vacuum tumbling chamber in response to the airtight driver being driven.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EXEMPLARY EMBODIMENTS

Figure 1:
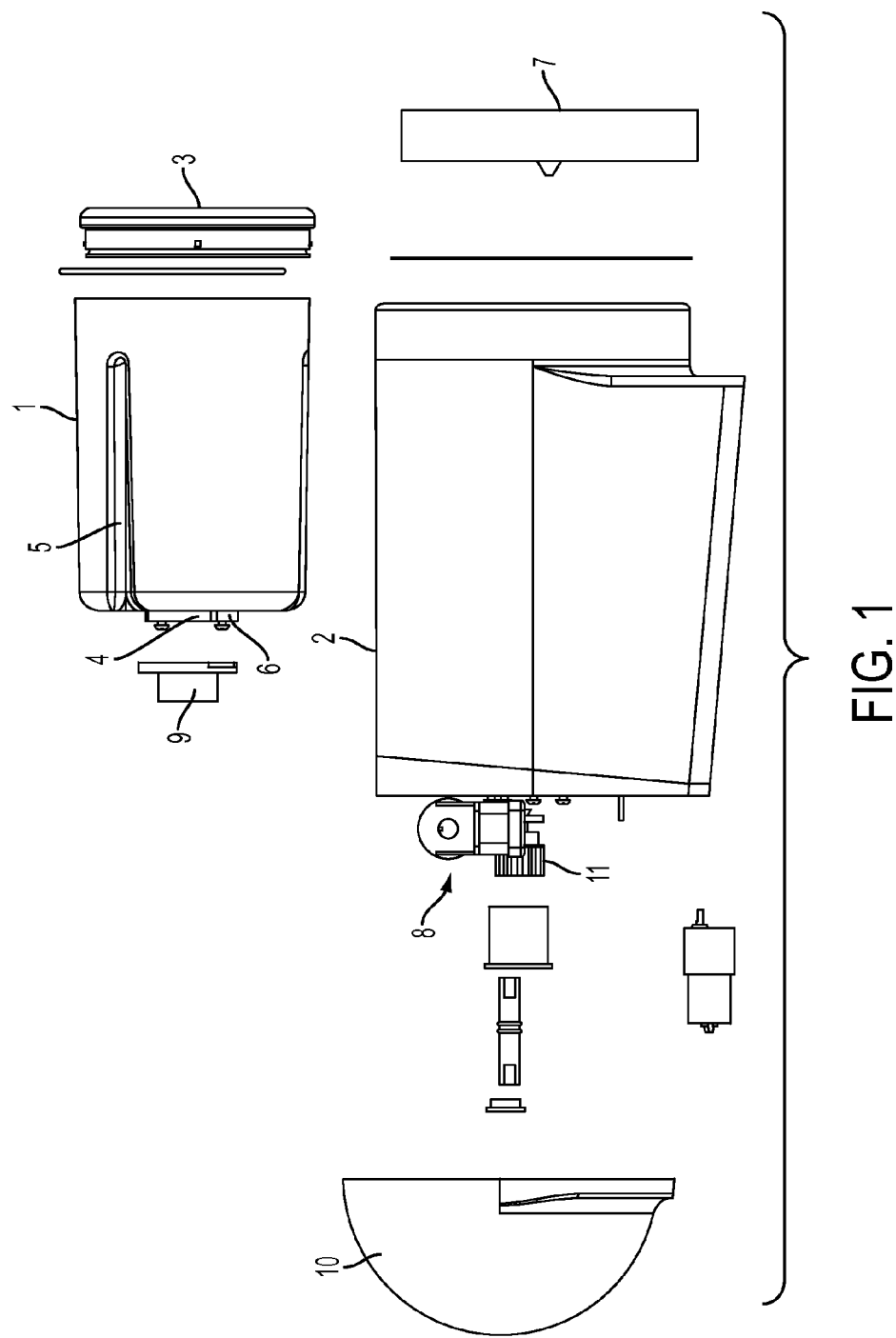
FIG. 1 is a diagram illustrating an exemplary embodiment of a side view of a vacuum tumbling system.

Various example embodiments will be described more fully hereinafter with reference to the accompanying drawings, in which some example embodiments are shown. Example embodiments may, however, be embodied in many different forms and should not be construed as limited to the example embodiments set forth herein. Rather, these example embodiments are provided so that this disclosure will be thorough and complete, and will fully convey the scope of the embodiments to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the embodiments. As used herein, the term "and/or" includes any and all combinations of one or more of the associated listed items.

It will be understood that when an element is referred to as being "connected", "attached", or "coupled" to another element, it can be directly connected, attached, coupled to the other element or intervening elements may be present. In contrast, when an element is referred to as being "directly connected", "directly attached", or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a diagram illustrating an exemplary embodiment of a side view of a vacuum tumbling system.

A vacuum tumbling system in FIG. 1 includes an inner vacuum tumbling chamber 1 and an outer vacuum chamber 2. As shown in FIG. 1, the inner vacuum tumbling chamber 1 is initially outside of the outer vacuum chamber 2. However, exemplary embodiments are not limited, and the inner vacuum tumbling chamber 1 may be initially placed inside the outer vacuum chamber 2.

In FIG. 1, the inner vacuum tumbling chamber 1 may be used to hold a material to be marinated (e.g., meat), a marinade mixture, and a liquid for the marinade mixture. As shown in FIG. 1, the inner vacuum tumbling chamber 1 looks very similar to a pot. Further, the inner vacuum tumbling chamber 1 may include fins (not shown) on an inner wall of the inner vacuum tumbling chamber 1. The fins of the vacuum tumbling chamber 1 help to move the material to be marinated to a top of the vacuum tumbling chamber 1.

The inner vacuum tumbling chamber 1 may include a lid 3. The lid 3 has a handle that may be used for removing the inner vacuum tumbling chamber 1 from the outer vacuum chamber 2. Further, the lid 3 may have a watertight seal around the outside. A handle of the lid 3 is at an elevated level, in comparison to an inner portion of the lid 3. However, the handle of the lid 3 is at a same or a similar level as an outer rim of the lid 3. Further, the lid 3 may be removable.

The inner vacuum tumbling chamber 1 may include a small hole 4 in a center of the inner vacuum tumbling chamber 1. Further, the small hole 4 may by recessed at a bottom of the inner vacuum tumbling chamber 1. The small hole 4, which is recessed at the bottom and at the center of the inner vacuum tumbling chamber, is tied into an airtight driving system 8. The airtight driving system 8 runs the tumbling action, and will described below.

When a user wants to place the inner vacuum tumbling chamber 1 into the outer vacuum chamber 2, the inner vacuum tumbling chamber 1 is tilted 15 degrees with respect to a horizontal plane. Since the inner vacuum tumbling chamber 1 is tilted 15 degrees, the inner vacuum chamber 1 has a lid 3 with a watertight seal to prevent liquid from escaping the inner vacuum tumbling chamber 1.

When the user wants to place the inner vacuum tumbling chamber 1 into the outer vacuum chamber 2, the inner vacuum tumbling chamber 1 is drawn into the outer vacuum chamber 2. Further, another small hole (not shown) in a center of the lid 3 allows the vacuum to be pulled in the inner vacuum tumbling chamber 1. The another small hole in the lid 3 also works as a pivot during the tumbling process to hold up the top of the inner vacuum tumbling chamber 1.

A recess 6 at a bottom of the inner vacuum tumbling chamber 1 ties into the airtight driving system or driver 8, and allows the inner vacuum tumbling chamber 1 to turn during the tumbling process. Further, the inner vacuum tumbling chamber 1 has outer grooves 5 on an outside of the inner vacuum tumbling chamber 1 for inserting the inner vacuum tumbling chamber 1 into the outer vacuum chamber 2.

However, exemplary embodiments are not limited to the above description. For example, the inner vacuum tumbling chamber 1 may be various shapes, including cylindrical, rectangular, hexagonal prism, etc. Further, the handle of the lid 3 of the inner vacuum tumbling chamber 1 may have a depressed shape near a center of the lid 3. The inner vacuum tumbling chamber 1 may also have no outer grooves 5 on the outside of the inner vacuum tumbling chamber 1. The inner vacuum tumbling chamber 1 may have an attachment 9 that attaches to the small hole 4, which is recessed at the bottom of the inner vacuum tumbling chamber 1. The attachment 9 may provide a mating of the inner vacuum tumbling chamber 1 to the outer vacuum chamber 2. Other embodiments and modifications would be apparent to one of ordinary skill in the art.

In FIG. 1, an outer vacuum chamber 2 may be a reinforced chamber in which the inner vacuum tumbling chamber 1 is placed. Further, the reinforced chamber of the outer vacuum chamber 2 may be a location where the vacuum is monitored and pulled.

The outer vacuum chamber 2 may have a reinforced lid 7. The reinforced lid 7 may be removable. The reinforced lid 7 has a handle at an elevated level, in comparison to an inner portion of the reinforced lid 7.

In the outer vacuum chamber 2, the airtight driving system 8 contains a circuit board, a vacuum pump, a vacuum motor, and a tumbling motor. The vacuum is pulled in the outside chamber through the airtight driving system 8. The small hole 4 in the center of the inner vacuum tumbling chamber 1 allows the vacuum to transfer into the inner vacuum tumbling chamber 1 from the outer vacuum chamber 2. The airtight driving system 8 may be disposed inside the outer vacuum chamber 2, or may be disposed external to the outer vacuum chamber 2.

The outer vacuum chamber 2 creates and maintains the vacuum pressure throughout the entire tumbling process by constantly measuring the vacuum pressure, and powering on or off the vacuum pump and the tumbling motor during the tumbling process. The tumbling motor maintains the tumble action throughout the tumbling process. The vacuum motor maintains the vacuum throughout the tumbling process. The vacuum motor is turned on and off based on the vacuum pressure as measured by a vacuum sensor (not shown), which may be provided inside the inner vacuum tumbling chamber 1 or alternatively within the outer vacuum chamber 2. The circuit board of the airtight driving system 8 may be used to drive signals to the vacuum tumbling system. Therefore, the circuit board of the airtight driving system 8 may be used to interface to and from the vacuum pump, the vacuum motor, and the tumbling motor. The outer vacuum chamber 2 encloses the entire tumbling process. Therefore, the user is protected from injury during the tumbling process. Further, the marinade mixture, the material to be marinated, and the liquid are held within the outer vacuum chamber 2 even if they spill from the inner vacuum chamber 1, and are not exposed (i.e., shown) to the user. Thus, exemplary embodiments disclose a single step process that protects the user from being injured by the internal moving parts.

The outer vacuum chamber 2 may be powered on and off by pushing an on/off switch. The outer vacuum chamber 2 may be powered by an external electrical outlet or an internal battery. For example, the circuit board, the vacuum pump, the vacuum motor, and the tumbling motor may be powered by the external electrical outlet or the internal battery.

However, exemplary embodiments are not limited to the above description. For example, the outer vacuum chamber 2 may have various shapes, including cylindrical, rectangular, a hexagonal prism, etc. Further, the outer vacuum chamber 2 may have a mating adapter 11 for mating with the attachment 9 of the inner tumbling vacuum chamber 1. The handle of the reinforced lid 7 of the outer vacuum chamber 2 may have a depressed shape near a center of the reinforced lid 7. The bottom of the outer vacuum chamber 2 may also be enclosed and covered with a dome covering 10. Other embodiments and modifications would be apparent to one of ordinary skill in the art.

Figure 2:
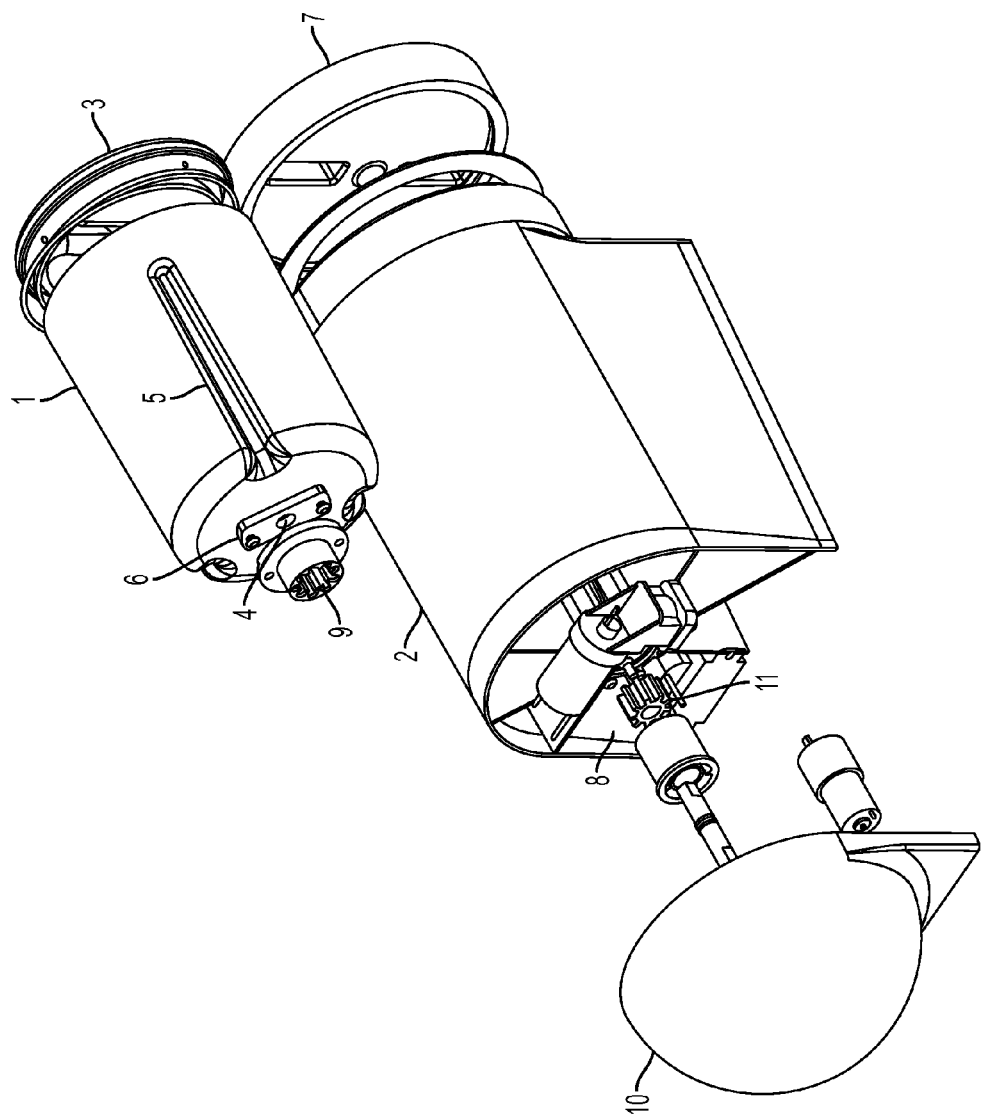
FIG. 2 is a diagram illustrating an exemplary embodiment of a cross-sectional view of a vacuum tumbling system.

FIG. 2 is a diagram illustrating an exemplary embodiment of a cross-sectional view of a vacuum tumbling system. Since all of the elements of FIG. 2 have been described with reference to FIG. 1, a detailed description of FIG. 2 will not be repeated.

Figure 3:
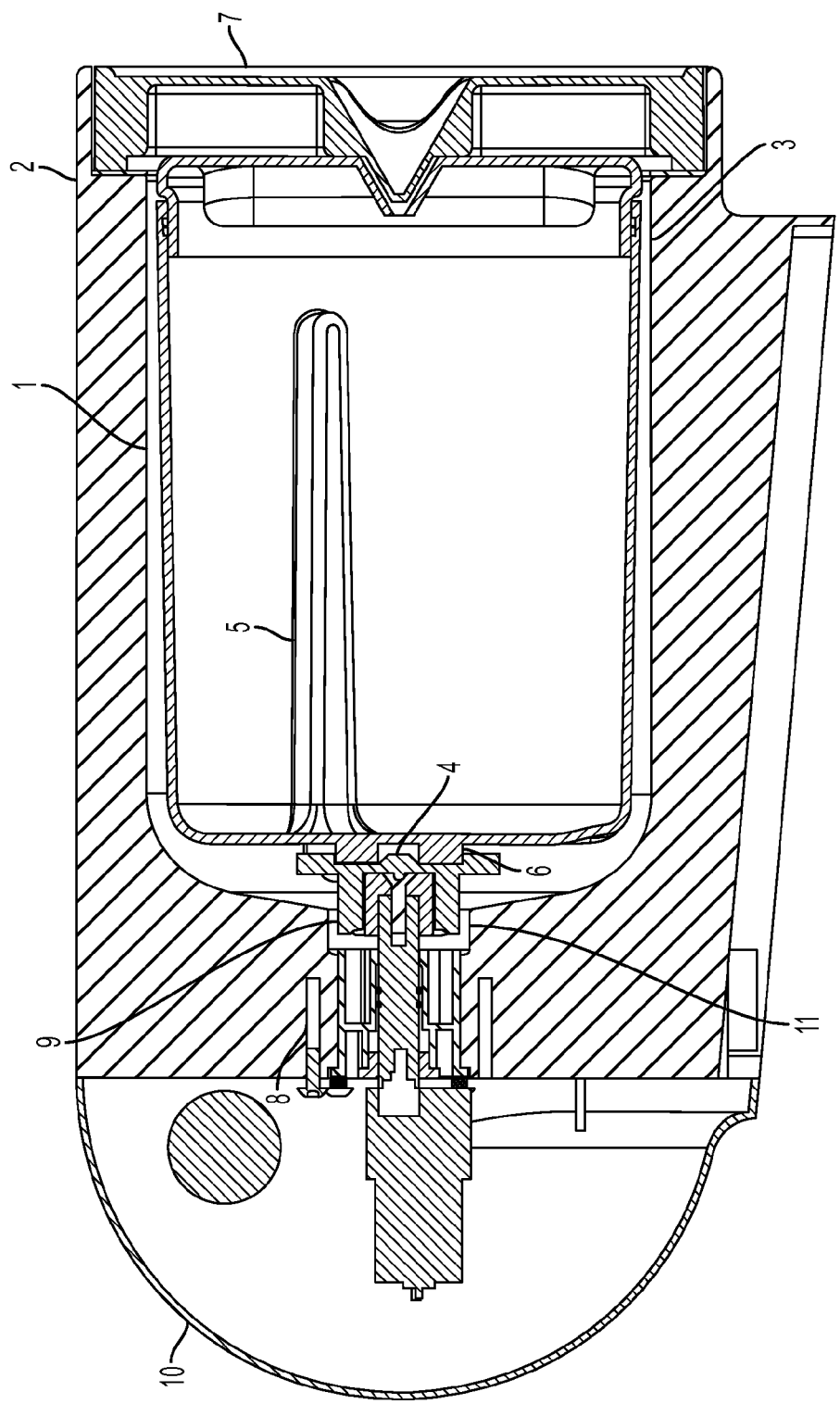
FIG. 3 is a diagram illustrating an exemplary embodiment of a cross-section view of a vacuum tumbling system in which the inner tumbling vacuum chamber 1 has been placed in the outer vacuum chamber 2.

FIG. 3 is a diagram illustrating an exemplary embodiment of a cross-section view of a vacuum tumbling system in which the inner tumbling vacuum chamber 1 has been placed in the outer vacuum chamber 2. Since all of the elements of FIG. 3 have been described with reference to FIG. 1, a detailed description of FIG. 3 will not be repeated.

Figure 4:
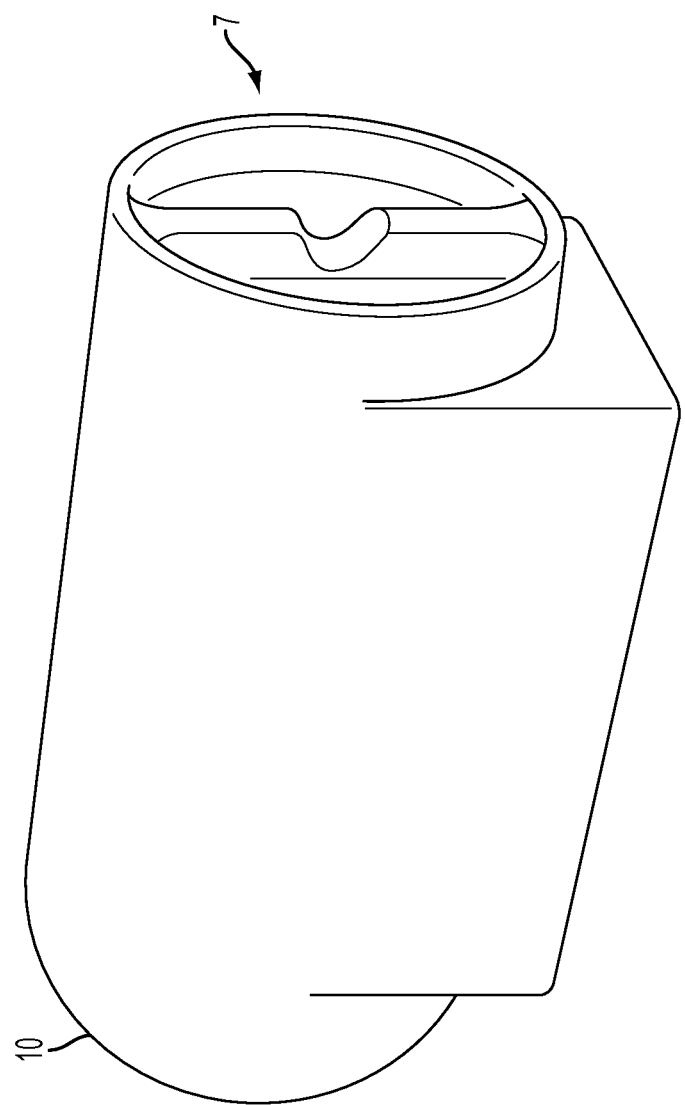
FIG. 4 is a diagram illustrating an exemplary embodiment of a view of a vacuum tumbling system, as viewed by a user.

FIG. 4 is a diagram illustrating an exemplary embodiment of a view of a vacuum tumbling system as viewed by a user. In FIG. 4, the handle of the reinforced lid 7 of the outer vacuum chamber is shown with the depressed shape near the center of the reinforced lid 7. Further, the handle of the reinforced lid 7 is at an elevated level, in comparison to an inner portion of the reinforced lid 7. In FIG. 4, the dome covering 10 is shown at an opposite end of the reinforced lid. Further, in FIG. 4, the airtight driving system 8 is internally enclosed in the outer vacuum chamber 2

The foregoing is illustrative of example embodiments and is not to be construed as limiting thereof. Although a few example embodiments have been described, those skilled in the art will readily appreciate that many modifications are possible in the exemplary embodiments without materially departing from the novel teachings and advantages of the embodiments. Accordingly, all such modifications are intended to be included within the scope of the embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A vacuum tumbling system for marinating a material, the system comprising:
    a vacuum sensor;
    an airtight driver;
    an outer vacuum chamber configured to monitor and pull a vacuum; and
    an inner vacuum tumbling chamber configured to enclose a marinade mixture, liquid, and the material, configured to be disposed inside the outer, vacuum chamber, and configured to pull the vacuum from the outer vacuum chamber through a hole which is recessed on a bottom surface of the inner vacuum tumbling chamber,
wherein
the outer vacuum chamber comprises an opening through which the airtight driver communicates with the inner vacuum tumbling chamber,
the vacuum is pulled from the outer vacuum chamber through the hole of the inner vacuum tumbling chamber and through the opening of the outer vacuum chamber, and
the outer vacuum chamber monitors the vacuum through the vacuum sensor, pulls the vacuum through the airtight driver, and tumbles the inner vacuum tumbling chamber in response to the airtight driver being driven.

2. The vacuum tumbling system of claim 1, wherein the airtight driver comprises:
a vacuum pump configured to be powered on or off based on the monitored vacuum;
a vacuum motor configured to drive the vacuum pump for pulling the vacuum;
a tumble motor configured to tumble the inner vacuum tumbling chamber; and
a circuit board configured to be connected to at least one of the vacuum pump, the vacuum motor, and the tumble motor.

3. The vacuum tumbling system of claim 2, wherein the vacuum pump is configured to be powered on in response to the monitored vacuum being below a predetermined level.

4. The vacuum tumbling system of claim 2, wherein the vacuum pump is configured to be powered off in response to the monitored vacuum being equal to or greater than a predetermined level.

5. The vacuum tumbling system of claim 1, wherein the airtight driver is configured to be disposed inside the outer vacuum chamber.

6. The vacuum tumbling system of claim 1, wherein the airtight driver is configured to be disposed external to the outer vacuum chamber.

7. The vacuum tumbling system of claim 1, wherein the airtight driver is configured to be driven by an external electrical outlet.

8. The vacuum tumbling system of claim 1, wherein the airtight driver is configured to be driven by a battery which is enclosed by the outer vacuum chamber.

9. The vacuum tumbling system of claim 1, wherein the inner vacuum tumbling chamber is tilted approximately 15 degrees with respect to a horizontal plane when the inner vacuum is disposed inside the outer vacuum chamber.

10. The vacuum tumbling system of claim 1, wherein the inner vacuum tumbling chamber comprises at least one fin on an inner wall of the inner vacuum tumbling chamber to move the material to a top of the inner vacuum tumbling chamber.

11. The vacuum tumbling system of claim 1, wherein the outer vacuum chamber comprises a mating adapter which mates with an attachment of the inner tumbling vacuum chamber.

12. A vacuum tumbling system for marinating a material, the system comprising:
a vacuum sensor;
an airtight driver;
an outer vacuum chamber configured to monitor and pull a vacuum;
an inner vacuum tumbling chamber configured to enclose a marinade mixture, liquid, and the material, configured to be disposed inside the outer vacuum chamber, and configured to pull the vacuum from the outer vacuum chamber through a hole in the inner vacuum tumbling chamber,
wherein
the outer vacuum chamber comprises an opening through which the airtight driver communicates with the inner vacuum tumbling chamber,
the vacuum is pulled from the outer vacuum chamber through the hole of the inner vacuum tumbling chamber and through the opening of the outer vacuum chamber.

13. The vacuum tumbling system of claim 12, wherein the outer vacuum chamber monitors the vacuum through the vacuum sensor, pulls the vacuum through the airtight driver, and tumbles the inner vacuum tumbling chamber in response to the airtight driver being driven.

* * * * *